R. L. HANEY.
WAGON BRAKE.
APPLICATION FILED FEB. 7, 1919.

1,336,956.

Patented Apr. 13, 1920.
2 SHEETS—SHEET 1.

Inventor
Robert L. Haney,
by Simon Lyons, Attorney.

R. L. HANEY.
WAGON BRAKE.
APPLICATION FILED FEB. 7, 1919.
1,336,956.
Patented Apr. 13, 1920.
2 SHEETS—SHEET 2.
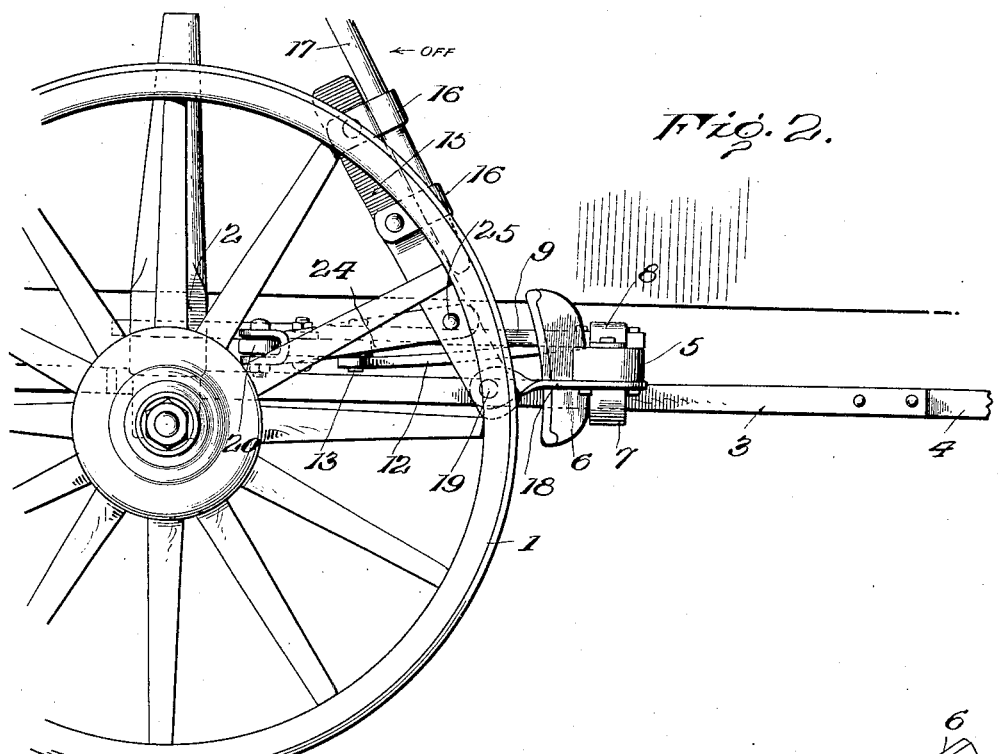
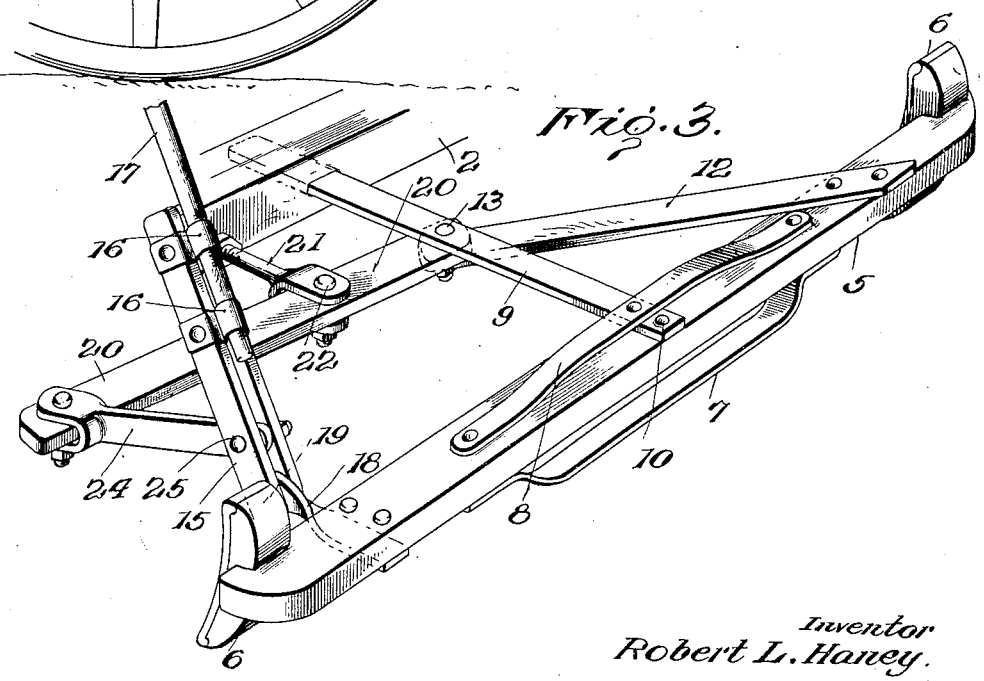
Inventor
Robert L. Haney.
by Simon Lyon,
Attorney.

UNITED STATES PATENT OFFICE.

ROBERT L. HANEY, OF ELKMONT, ALABAMA.

WAGON-BRAKE.

1,336,956.  Specification of Letters Patent.  Patented Apr. 13, 1920.

Application filed February 7, 1919. Serial No. 275,580.

*To all whom it may concern:*

Be it known that I, ROBERT L. HANEY, a citizen of the United States of America, and resident of Elkmont, Limestone county, State of Alabama, have invented certain new and useful Improvements in Wagon-Brakes, of which the following is a specification.

This invention relates to certain improvements in brakes for wagons and the like; and the objects and nature of the invention will be readily understood by those skilled in the art in the light of the following explanation of the accompanying drawings illustrating what I now believe to be the preferred embodiment or mechanical expression of my invention from among other forms, constructions and arrangements within the spirit and scope thereof.

An object of the invention is to provide operating devices for wagon brakes with the ends in view of overcoming certain disadvantages in construction and operation of the brakes of this type now in use, and of providing an exceedingly powerful and efficient brake that will be simple and durable in construction and easily applied to vehicle running gear.

With these and other objects in view my invention consists in certain novel features of construction and in combinations and arrangements as more fully and particularly set forth hereinafter.

Referring to the accompanying drawings:—

Fig. 2, is a similar view but showing the brake mechanism with the brake applied.

Fig. 3 is a detail sectional view.

Figure 1:
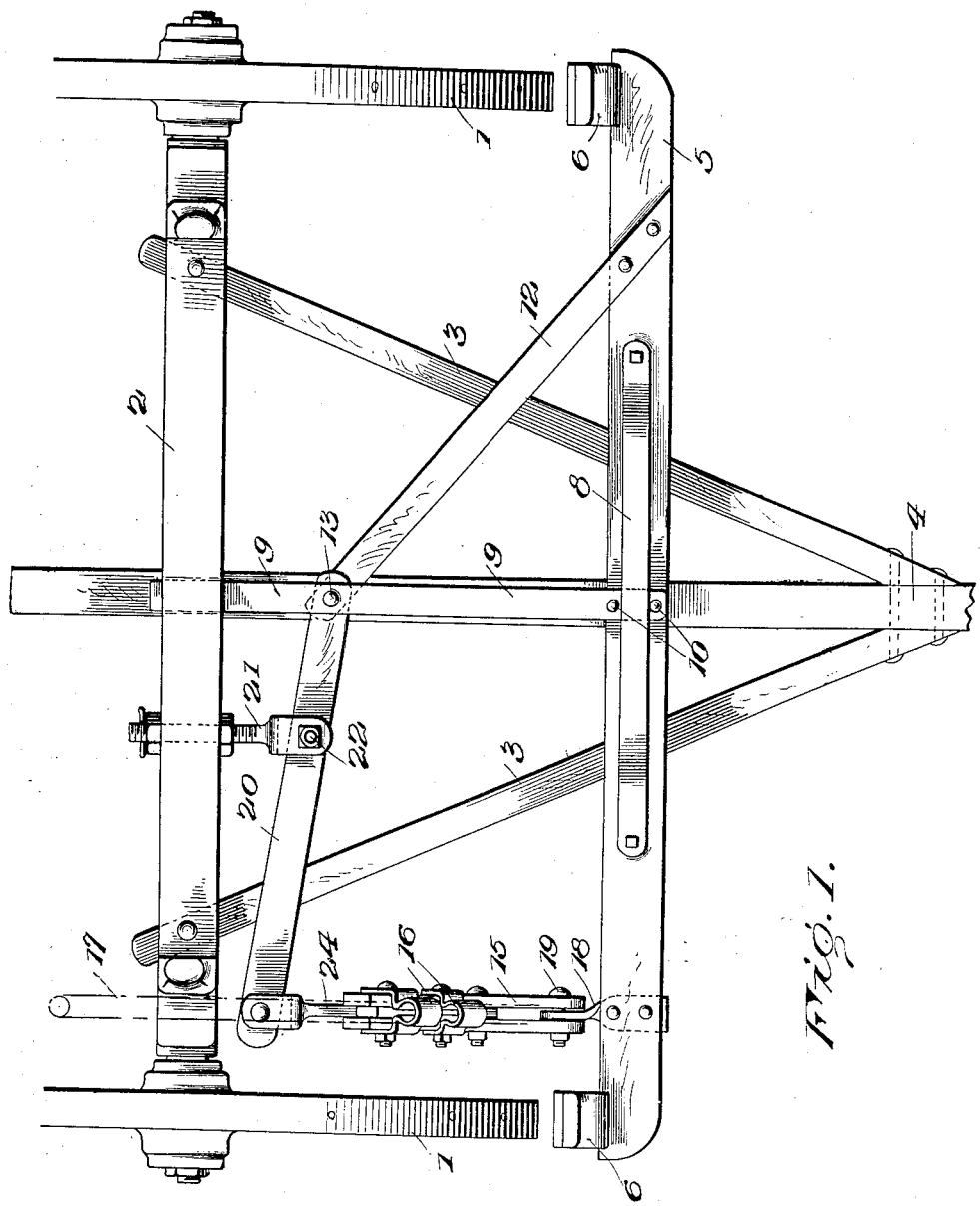
Figure 1, is a top plan view of vehicle running gear showing my brake mechanism in normal position.

In the drawings I show the rear wheels 1 of the wagon; the rear bolster 2; the hounds 3, and the coupling or reach 4. The brake beam 5 is arranged in advance of the rear wheels and can be provided with brake shoes 6 supported and attached in any suitable manner. The brake beam can be of any suitable construction although I show a single straight beam of rigid stiff formation with the brake shoes at its opposite ends to apply the desired pressure and friction to the wheel tires. This beam is arranged transversely of and resting on the hounds and reach and is loosely coupled thereto to slide longitudinally thereof to carry the brake shoes toward the wheel tires. I show the beam provided with two corresponding elongated metal bands or bars arranged longitudinally of its upper and lower sides and fixed thereto at their ends by vertical bolts to form a lower guide loop 7, passing under the hounds and reach, and an upper loop 8. These loops stiffen and brace the brake beam while the lower loop holds the beam against upward movement from the hounds.

The brake beam is provided with a rigid rearward extension through which the brake applying power is applied to the beam, and this extension also serves to aid in holding the brake beam against undue upward and endwise movements and in confining the beam to its path of movement in the direction of draft toward and from the rear wheels.

In the particular example illustrated, this rearward extension rigid with the brake beam, embodies a strong stiff metal pull bar 9 arranged centrally and longitudinally of the running gear and located above the reach and at its front end fixed to the center of the brake beam through the medium of one or more bolts 10 and at its rear end extending and slidable through a slot or hole cut through the bolster to receive and form a guide for said bar. The front end of this longitudinal bar preferably extends into the center of the upper loop 8 and the bolt 10 extends through said loop and secures the same to the bar so that said upper loop forms a truss for the brake beam and the front end of said bar constitutes the center abutment of the truss. The rigid rearward extension of the brake beam also includes in the specific example illustrated, a stiff rigid inclined brace bar 12, at its rear end fixed to the bar 9, about midway between the bolster and brake beam by bolt 13, and at its forward end rigidly bolted or otherwise fixed to an end portion of the brake beam.

The primary or operating lever is applied to the other end of the brake beam from that end to which the inclined brace 12 is secured. This operating lever 15 is vertically swingable and is arranged between adjacent ends of the bolster and brake beam approximately longitudinally of the running gear and is located to one side of the wagon box or body and near the adjacent rear wheel. The upper or rear end portion of this operating lever is provided with sleeves 16 to receive the handle or pole 17 by which the brake is operated. The lower end of the lever has pivotal pull connection with the adjacent end of the brake beam, while the intermediate or approximately central portion of the lever has pivotal leverage pull connection with the rearward extension of the brake beam. The pivotal pull connection, above mentioned, is established through the medium of a rigid bracket 18 fixed to and projecting rearwardly from the brake beam end portion, and transverse pivot bolt 19, pivotally joining the lower end of said lever to the rear end of said bracket.

The leverage pull connection mentioned is established through the medium of a horizontally-disposed intermediate lever 20 arranged transversely of the running gear and in front of the bolster and fulcrumed by vertical pivot 22 to rigid bracket 21 fixed to and projecting forwardly from the bolster; the short arm of lever 20 being pivotally joined to the rigid rearward extension of the brake beam at the end of brace 12 and the long outer arm of the lever 20 being pivotally coupled to the operating lever at a point between the upper and lower ends thereof. The intermediate lever 20 is arranged above the hounds and reach and its inner end is pivotally joined to the pull bar 9 by a suitable bolt or pivot. For instance, the bolt 13 can be utilized for this purpose. The outer end of the intermediate lever 20 is arranged under and behind the upper part of the operating lever and is provided with a forwardly extending pull bar or arm 24, on the front end of which the operating lever is pivoted or fulcrumed through the medium of transverse pivot or bolt 25 located approximately midway between the upper and lower ends of said operating lever.

The leverage devices are so arranged that when the operating lever is in normal lowered position, the short inner arm of the intermediate lever is at its limit of forward movement and the brake beam is in normal position with its brake shoes advanced from braking engagement with the wheel tires. When the operator wishes to apply the brakes, the operating lever is swung upwardly and forwardly, whereby the lower end of the operating lever exerts direct rearward pull on the beam through the bracket 18, the operating lever then fulcruming on the pivot 25. At the same time, the operating lever in fulcruming on the pivot 19, exerts forward pull on the arm 24 and hence rocks the intermediate lever in a direction to force its short arm rearwardly and thereby exert rearward pull on the brake beam through the rigid rearward extension thereof. The brake beam is hence drawn rearwardly to force its broke shoes into braking engagement with the wheel rims. During this action, the brake beam slides rearwardly and its rearward extension slides in the bolster and maintains the brake beam in its desired position at right angles to the longitudinal axis of the running gear, while the leverage arrangement is such in connection with the brake beam rearward extension to maintain approximately uniform pressure of both ends of the brake beam toward the wheel rims.

The leverage arrangement is such that the brake beam shoes can be held to the wheel rims under tremendous pressure, by the application of a minimum amount of power to the handle of the operating lever.

The various levers and other operating parts can be of any suitable form and construction and mounted and supported in any suitable manner to function as required. The various brackets and connections can also be of any suitable formation and construction. The brake can be easily applied to wagon running gear. The center slot is cut through the bolster to receive the rear end of the pull bar 9. A hole is bored through the bolster to one side of said slot, to receive the shank of a forked bolt that can be utilized to form the fulcrum bracket 21.

The brake beam can be easily slipped onto the hounds, with its bottom loop extending under the hounds, after the reach has been uncoupled. The brake beam can be slipped into position with the various lever parts coupled thereto, and when in position, the pin that fulcrums the intermediate lever to bracket 21 can be applied.

In fact, in the example illustrated, the only change in the vehicle running gear necessary for the application of the brake, is that involved in cutting said slot and boring said hole.

It is evident that various changes, modifications and variations might be resorted to without departing from the spirit and scope of my invention, and hence I do not wish to limit myself to the exact disclosures hereof.

What I claim is:—

1. A wagon brake mechanism, comprising a brake beam adapted to rest and slide on the hounds of the wagon running gear and having a bottom loop to loosely pass under said hounds, said beam having a central rearward rigid pull bar fixed thereto and adapted to slidably enter the rear bolster of the running gear, an intermediate lever adapted to be fulcrumed to the vehicle running gear and having pull connection with said pull bar, an operating lever having direct fulcruming pull connection with one end of said beam, and also having fulcruming pull connection with said intermediate lever, and a rigid brace from said pull bar at the pull connection of the intermediate lever therewith to the opposite end of said beam.

2. A wagon brake comprising a brake beam having a bottom loop to pass under the running gear hounds, said beam constructed to slidably rest on the hounds, an extension rigid with and extending rearwardly from the top of said beam and slidably confined to the running gear, a top truss forming loop on said beam extending across said extension and secured thereto so that the latter forms the center abutment of said truss, an operating lever having pull connection with said beam, and an intermediate lever pivotally coupled to said extension and to said beam.

3. A wagon brake comprising a brake beam having a rearwardly extending central pull and guide bar and an inclined brace fixed thereto and to an end portion of the beam, an intermediate lever adapted to be fulcrumed to the running gear and at one end having connection with said bar at the end of said brace, and an operating lever carried by the beam and intermediate lever and having separate pull connections with the other end of said beam and with said intermediate lever.

ROBERT L. HANEY.